(12) United States Patent
Kazama et al.

(10) Patent No.: US 7,399,440 B2
(45) Date of Patent: Jul. 15, 2008

(54) CELLULOSE ESTER FILM AND ITS MANUFACTURING METHOD

(75) Inventors: Kenichi Kazama, Hino (JP); Takeshi Tanaka, Hino (JP); Masakazu Kurokawa, Hino (JP)

(73) Assignee: Konica Corporation, Tokyo (JP)

( * ) Notice: Subject to any disclaimer, the term of this patent is extended or adjusted under 35 U.S.C. 154(b) by 678 days.

(21) Appl. No.: 10/750,618

(22) Filed: Dec. 31, 2003

(65) Prior Publication Data

US 2004/0155378 A1 Aug. 12, 2004

Related U.S. Application Data

(62) Division of application No. 10/066,493, filed on Jan. 31, 2002, now abandoned.

(30) Foreign Application Priority Data

Feb. 14, 2001 (JP) ............................. 2001-036779

(51) Int. Cl.
*B29C 41/24* (2006.01)
*B29C 41/46* (2006.01)

(52) U.S. Cl. ....................... 264/217; 264/212

(58) Field of Classification Search ................ 264/217
See application file for complete search history.

(56) References Cited

U.S. PATENT DOCUMENTS

| | | | | |
|---|---|---|---|---|
| 4,664,859 A * | 5/1987 | Knoop | ........................ | 264/102 |
| 4,746,475 A * | 5/1988 | Kohn | .......................... | 264/41 |
| 4,748,050 A * | 5/1988 | Takahashi et al. | ........... | 427/164 |
| 5,558,206 A * | 9/1996 | Helgerson et al. | ....... | 198/781.04 |
| 5,862,946 A * | 1/1999 | Roerty et al. | ................... | 222/1 |
| 5,922,506 A * | 7/1999 | Hoogmartens et al. | ... | 430/273.1 |
| 6,036,913 A * | 3/2000 | Shibue et al. | ................ | 264/489 |
| 6,320,042 B1 * | 11/2001 | Michihata et al. | ............. | 536/69 |
| 6,582,645 B2 * | 6/2003 | Takeda | ......................... | 264/207 |
| 6,731,357 B1 * | 5/2004 | Tachibana et al. | ............. | 349/96 |
| 6,974,608 B2 * | 12/2005 | Shimizu et al. | ............. | 428/1.33 |
| 7,070,719 B2 * | 7/2006 | Tachibana et al. | ........... | 264/1.34 |
| 2002/0039707 A1 * | 4/2002 | Goto | .......................... | 430/350 |
| 2002/0041352 A1 * | 4/2002 | Kuzuhara et al. | ............ | 349/117 |
| 2002/0102369 A1 * | 8/2002 | Shimizu et al. | ............. | 428/1.33 |
| 2002/0156270 A1 * | 10/2002 | Kazama et al. | ................ | 536/58 |
| 2003/0170482 A1 * | 9/2003 | Murakami | ................... | 428/615 |
| 2004/0052977 A1 * | 3/2004 | Ogawa et al. | ................. | 428/1.1 |
| 2004/0080693 A1 * | 4/2004 | Kuzuhara et al. | ............ | 349/117 |
| 2004/0174474 A1 * | 9/2004 | Tachibana et al. | ............. | 349/96 |
| 2005/0012239 A1 * | 1/2005 | Nakashima | .................. | 264/216 |
| 2005/0238820 A1 * | 10/2005 | Tachibana et al. | ............ | 428/1.1 |

FOREIGN PATENT DOCUMENTS

EP 1 033 592 * 6/2000

* cited by examiner

*Primary Examiner*—Monica Huson
(74) *Attorney, Agent, or Firm*—Lucas & Mercanti, LLP (57) ABSTRACT

Disclosed is a cellulose ester film having a dry thickness of 20 to 60 μm, wherein the cellulose ester film is manufactured according to a solution cast film manufacture process comprising the steps of providing a cellulose ester dope, casting the cellulose ester dope on a support to form a cellulose ester web, peeling the cellulose ester web at a peel position from the support, transporting the peeled web to a dryer, drying the peeled web therein to form a cellulose ester film, and winding the cellulose ester film around a spool, the residual solvent content at the winding step of the cellulose ester film being not more than 0.05% by weight.

4 Claims, 3 Drawing Sheets

CELLULOSE ESTER FILM AND ITS MANUFACTURING METHOD

CROSS-REFERENCE TO RELATED APPLICATIONS

This Application is a Divisional Application of U.S. Pat. No. 10/066,493, filed Jan. 31, 2002 now abandoned.

FIELD OF THE INVENTION

The present invention relates to a cellulose ester film useful for a protective film of polarizing plate and a polarizing plate used in a liquid crystal display.

BACKGROUND OF THE INVENTION

Figure 1:
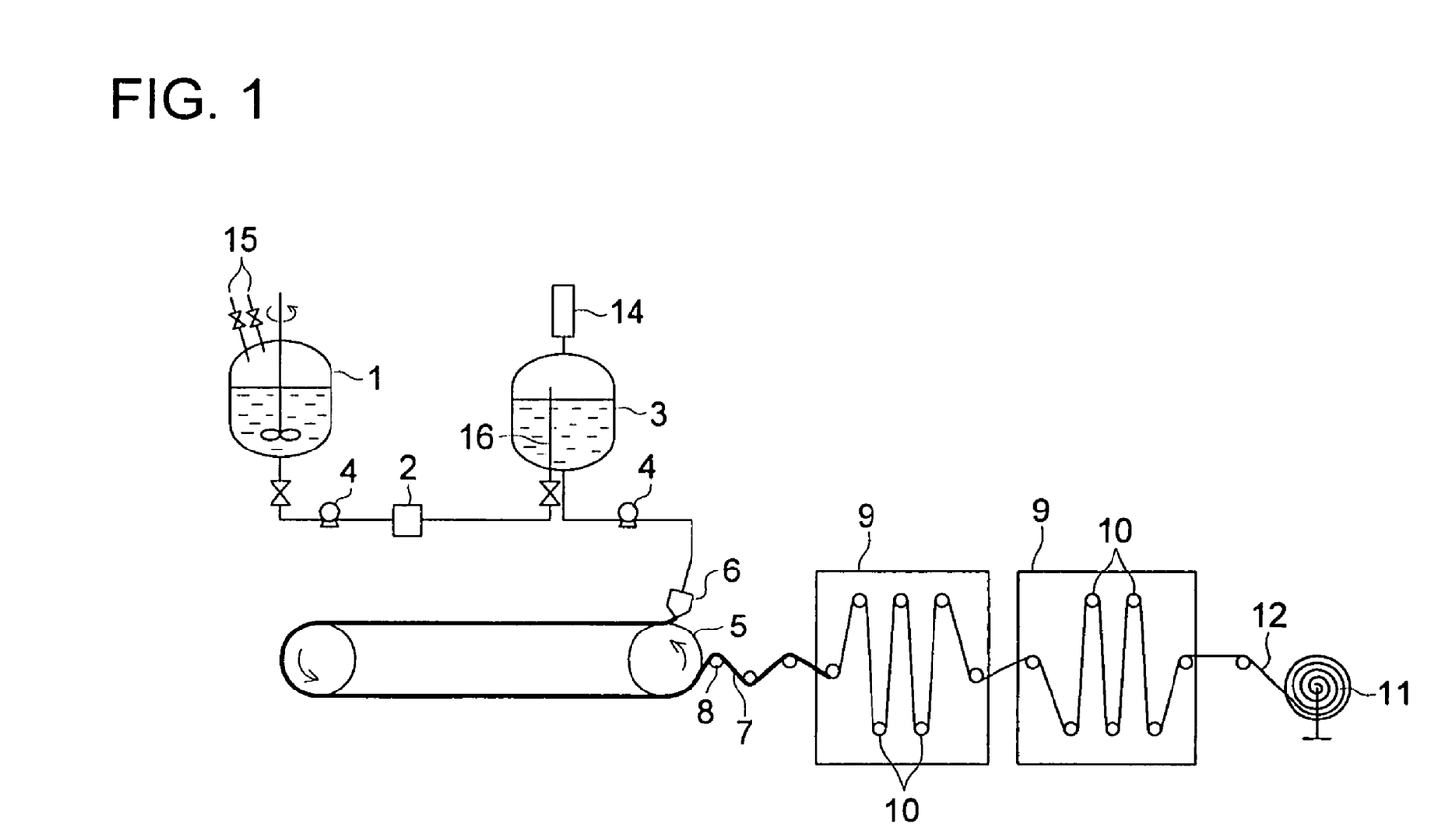
FIG. 1 shows a schematic view of an apparatus for manufacturing a cellulose ester film according to a solution cast film manufacture process.

Manufacture of a cellulose ester film according to a conventional solution cast film manufacturing process has been carried out employing an apparatus for manufacturing a cellulose ester film as shown in FIG. 1. FIG. 1 is a schematic view of a solution cast cellulose ester film manufacturing apparatus including a dissolution device. A manufacturing method of a cellulose ester film according to a conventional solution cast film manufacturing process will be explained below, employing FIG. 1. A cellulose ester is dissolved in an organic solvent in a pressure resistant vessel 1 (a dissolution step), filtered through a filter 2 to prepare a cellulose ester dope, transported through a supply pump 4 to a storing vessel 3, and cast on a metal support 5 through a supply pump 4 from a die 6 to form a web 7. The metal support 5 is a moving endless stainless steel belt support whose surface is subjected to mirror treatment or a drum support whose surface is plated with chromium. The web 7 is made semidry on the metal support, and then the semidry web 7 is peeled from the support through a peel roller 8 (located at a peel position). The peeled web 7 is introduced into a roller drier 9, transported through the guide rollers 10 during which drying of the web is completed, and finally wound around a spool 11 to obtain a cellulose ester film 12. In FIG. 1, the roller dryer 9 comprises many guide rollers 10 which are arranged so that the surface side and the rear side of the web 7 alternately contact the rollers. A numerical number 14 shows a condenser, and a numerical number 15 shows a material incorporation port. A tension changing device (not illustrated in FIG. 1) is located between the peel roller 8 and a spool 11 which changes the tension of the web upstream and downstream of the tension changing device.

Drying in the roller dryer is generally carried out employing a dry air, but there is also a method disclosed in U.S. Pat. No. 2,319,053 in which drying is carried out employing infrared rays. There is another drying method in which drying is carried out floating the web by air pressure and transporting the web in a non-contact state so that the web does not directly contact the guide roller (as disclosed in, for example, Japanese Patent O.P.I. Publication No. 55-135046).

Further, there is a tenter method in which a film such as a polyester film or a polypropylene film is stretched by a factor of 2 to 6, fixing the both side edges of the film. This tenter method can be also applied to a cellulose acetate film. A method of manufacturing a cellulose acetate film employing a tenter drying method is disclosed in Japanese Patent O.P.I. Publication Nos. 4-284211 and 62-115035.

Figure 2:
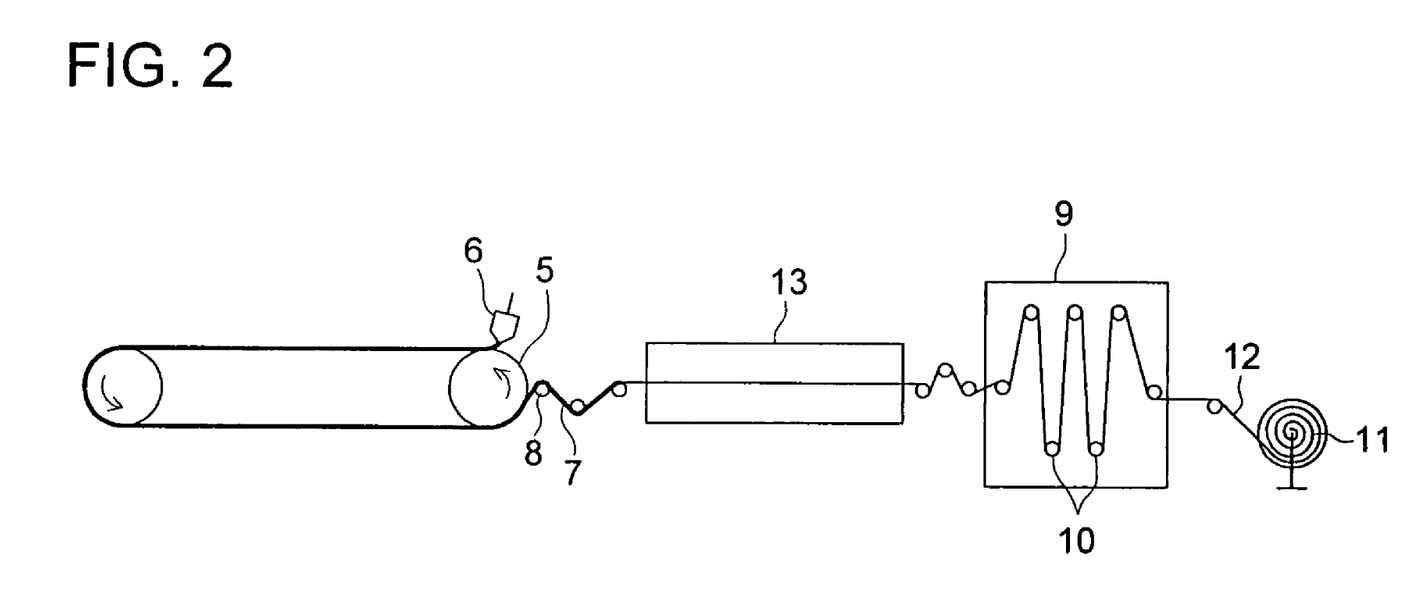
FIG. 2 shows a schematic view of a solution cast cellulose ester film manufacturing apparatus comprising a tenter dryer.

FIG. 2 shows a schematic view of a solution cast cellulose ester film manufacturing apparatus comprising a tenter dryer (another device such as the dissolution vessel is not illustrated in FIG. 2). The web 7 peeled by a peel roller 8 is transported and dried in a tenter dryer 13 where both edges in the transverse direction of the web are held by a clip (not illustrated in FIG. 2) to maintain the width of the web constant-or the web is stretched a little. Roller dryers may be located upstream and downstream of the tenter dryer. In FIG. 2, roller dryer 9 is located downstream of the tenter dryer.

Recently, development has been made regarding decrease in thickness and weight of an information device with a liquid crystal display such as a note board type personal computer, a car navigation system, a cell phone, a game device, or a television. In parallel with this development, a cellulose ester film has been used as a protective film of a polarizing plate as an optical film or a film for electro-luminescence, and has been eagerly sought to be increasingly thinner.

However, when a thin cellulose ester film is installed in a liquid crystal display and the like, the film has the problem in that the film deforms at high temperature with time. In the manufacture of the thin film, when the web is peeled from a metal support or while the peeled web is transported, the web is likely to be influenced by outer force such as transport tension due to its softness, and to cause elongation or surface defects such as scratches, streaks and transverse streaks. The finished cellulose ester may contain air bubbles or foreign matter on account of insufficient defoaming or filtration in the dissolution-step of cellulose ester. The finished cellulose ester may contain undissolved matter which cannot be removed by a filter used. Such defects lower quality of the finished cellulose ester film, adversely affect a liquid crystal display, and result in cost increase or lowering of productivity.

In a thin cellulose ester film such as a cellulose ester film with a dry thickness of 20 to 60 μm, there arise problems such as deformation and occurrence of minute air bubbles which are undesired for a liquid crystal display and which have been hardly observed in a conventional thick cellulose ester film such as a cellulose ester film with a dry thickness exceeding 60 μm.

SUMMARY OF THE INVENTION

The present invention has been made in view of the above. A first object of the invention is to provide a cellulose ester film which is thin and does not deform with time and a manufacturing method thereof. A second object of the invention is to provide a cellulose ester film which is optically isotropic and does not easily produce scratches and a manufacturing method thereof. A third object of the invention is to provide a cellulose ester film with no air bubbles and undissolved matter and a manufacturing method thereof.

DETAILED DESCRIPTION OF THE INVENTION

The present invention can be attained by the following constitutions:

1. a cellulose ester film having a dry thickness of 20 to 60 μm, wherein the cellulose ester film is manufactured according to a solution cast film manufacture process comprising the steps of providing a cellulose ester dope, casting the cellulose ester dope on a support to form a cellulose ester web, peeling the cellulose ester web at a peel position from the support, transporting the peeled web to a dryer, drying the peeled web therein to form a cellulose ester film, and winding the cellulose ester film around a spool, the residual solvent content at the winding step of the cellulose ester film being not more than 0.05% by weight.

2. the cellulose ester film of item 1, wherein the difference between the maximum residual solvent content and the minimum residual solvent content in the transverse direction of the cellulose ester film is not more than 0.02% by weight.

3. a cellulose ester film having a dry thickness of 20 to 60 μm, the cellulose ester film being manufactured according to a solution cast film manufacture process comprising the steps of providing a cellulose ester dope, casting the cellulose ester dope on a support to form a cellulose ester web, peeling the cellulose ester web at a peel position from the support, transporting the peeled web to a dryer, drying the peeled web therein to form a cellulose ester film, and winding the cellulose ester film around a spool, wherein the peeled web is transported through a transport device from the peel position to a tension changing device nearest to the peel position at a tension of 10 to 100 N/m, the tension changing device being located between the peel position and the spool.

4. the cellulose ester film of item 3, wherein the tension is 10 to 80 N/m.

5. the cellulose ester film of item 3, wherein the tension is 10 to 50 N/m.

6. the cellulose ester film of item 3, wherein the distance between the peel position and the tension changing device is 2 to 90 m in terms of the web length.

7. the cellulose ester film of item 3, wherein the transport device uses guide rollers or an air float system.

8. the cellulose ester film of item 7, wherein some or all of the guide rollers are tendency rollers.

9. a cellulose ester film having a dry thickness of 20 to 60 μm, the cellulose ester film being manufactured according to a solution cast film manufacture process comprising the steps of providing a cellulose ester dope, casting the cellulose ester dope on a support to form a cellulose ester web, peeling the cellulose ester web at a peel position from the support, transporting the peeled web to a dryer, drying the peeled web therein to form a cellulose ester film, and winding the cellulose ester film around a spool, wherein the cellulose ester dope is provided by a method comprising the steps of a) mixing a cellulose ester and one or more solvents comprising an organic solvent with a boiling point BP (° C.) as the main organic solvent in a tightly sealed pressure resistant vessel and heating the resulting mixture to around BP, b) unsealing the vessel at that temperature to allow it to stand for not less than 6 minutes, re-sealing the vessel and further heating the mixture to a temperature of from BP to BP+50 (° C.) to obtain a cellulose ester dope.

10. the cellulose ester film of item 9, wherein the cellulose ester film contains no air bubbles with a size of not less than 0.3 μm.

11. the cellulose ester film of item 9, wherein the method comprising the steps of after the re-sealing, c) further heating the mixture to a temperature of BP+20 to BP+50 (° C.) to be in a state of increased pressure, and d) maintaining the resulting mixture at that pressure to obtain a cellulose ester dope.

12. the cellulose ester film of item 11, wherein the cellulose ester film contains no air bubbles with a size of not less than 0.3 μm.

13. the cellulose ester film of item 1, wherein the residual solvent content is not more than 0.04% by weight.

14. the cellulose ester film of item 1, wherein the residual solvent content is not more than 0.02% by weight.

21. a cellulose ester film manufactured according to a solution cast film manufacture process, wherein the cellulose ester film has a dry thickness of 20 to 60 μm, and has a residual solvent content of not less than 0.05% by weight at a winding step.

22. the cellulose ester film of item 21 above, wherein the difference between the maximum residual solvent content and the minimum residual solvent content in the transverse direction of the cellulose ester film is not more than 0.05% by weight.

23. a method for manufacturing a cellulose ester film with a dry thickness of 20 to 60 μm according to a solution cast film manufacture process, wherein the method comprises the steps of casting a cellulose ester film dope on a metal support to form a cellulose ester web, peeling the cellulose ester web at a peel position from the support, and then transporting the peeled web from the peel position to a tension changing device at a tension of 10 to 100 N/m.

24. a method for manufacturing a cellulose ester film of item 23 above, wherein the tension is 10 to 80 N/m.

25. a method for manufacturing a cellulose ester film of item 24 above, wherein the tension is 10 to 50 N/m.

26. a method for manufacturing a cellulose ester film of any one of items 3 to 5 above, wherein the distance from the peel position to the tension changing device is 2 to 90 m in terms of the web length.

27. a method for manufacturing a cellulose ester film of any one of items 23 to 26 above, wherein a device for transporting the peeled web to the tension changing device uses guide rollers and/or an air float system.

28. a method for manufacturing a cellulose ester film of item 27 above, wherein a part or all of the guide rollers is tendency rollers.

29. a method for manufacturing a cellulose ester film from a cellulose ester dope according to a solution cast film manufacture process, wherein the method comprises the steps of a) mixing a cellulose ester and one or more solvents comprising an organic solvent with a boiling point BP (° C.) as the main organic solvent in a tightly sealed pressure resistant vessel and heating the resulting mixture to around BP; and b) unsealing the vessel at that temperature to allow it to stand for not less than 6 minutes, re-sealing the vessel and further heating the mixture to a temperature of from BP to BP+50 (° C.), whereby the cellulose ester is dissolved in the solvents to obtain a cellulose ester dope.

30. a method for manufacturing a cellulose ester film containing no air bubbles with a size of not less than 0.3 μm from a cellulose ester dope according to a solution cast film manufacture process, wherein the method comprises the steps of a) mixing a cellulose ester and one or more solvents comprising an organic solvent with a boiling point BP (° C.) as the main organic solvent in a tightly sealed pressure resistant vessel and heating the resulting mixture to around BP; and b) unsealing the vessel at that temperature to allow it to stand for not less than 6 minutes, re-sealing the vessel and further heating the mixture to a temperature of from BP to BP+50 (° C.), whereby the cellulose ester is dissolved in the solvents to obtain a cellulose ester dope.

31. a method for manufacturing a cellulose ester film from a cellulose ester dope according to a solution cast film manufacture process, wherein the method comprises the steps of a) mixing a cellulose ester and one or more solvents comprising an organic solvent with a boiling point BP (° C.) as the main organic solvent in a tightly sealed pressure resistant vessel and heating the resulting mixture to around BP; b) unsealing the vessel at that temperature to allow it to stand for not less than 6 minutes; c) re-sealing the vessel and further heating the mixture to a temperature of from BP+20 to BP+50 (° C.) to be in a state of increased pressure; and d) maintaining the resulting mixture at that pressure, whereby the cellulose ester is dissolved in the solvents to obtain a cellulose ester dope.

32. a method for manufacturing a cellulose ester film containing no air bubbles with a size of not less than 0.3 μm from a cellulose ester dope according to a solution cast film manufacture process, wherein the method comprises the steps of a) mixing a cellulose ester and one or more solvents comprising an organic solvent with a boiling point BP (° C.) as the main organic solvent in a tightly sealed pressure resistant vessel and heating the resulting mixture to around BP; b) unsealing the vessel at that temperature to allow it to stand for not less than 6 minutes; c) re-sealing the vessel and further heating the mixture to a temperature of from BP+20 to BP+50 (° C.) to be in a state of increased pressure; and d) maintaining the resulting mixture at that pressure, whereby the cellulose ester is dissolved in the solvents to obtain a cellulose ester dope.

33. a method for manufacturing a cellulose ester film of any one of items 9 to 12 above, wherein the dry thickness of the cellulose ester film is 20 to 60 μm.

34. a cellulose ester film manufactured according to a solution cast film manufacture process, wherein the cellulose ester film contains no air bubbles with a size of not less than 0.3 μm.

35. a method for manufacturing a cellulose ester film of item 34 above, wherein the dry thickness of the cellulose ester film is 20 to 60 μm.

36. A cellulose ester film manufactured according to the method of any one of items 23 to 33 above.

The present invention will be detailed below.

The present inventors have made an extensive study on the phenomenon that a thin cellulose ester film such as a cellulose ester film with a thickness of 20 to 60 μm prepared according to a solution cast film manufacture process, which is installed in a liquid crystal display, is deformed at high temperature with time. As a result, the present inventors have found that the phenomenon occurs due to gradual movement of an organic solvent remaining in the cellulose ester film to the film surface. In a conventional cellulose ester film such as a cellulose ester film with a thickness exceeding 60 μm, ever if it has the same residual organic solvent content (represented by formula described later) as the thin cellulose ester film as described above, such a deformation has been hardly observed, since it occurs very slightly and extremely slowly. The conventional cellulose ester film, even if it has a residual solvent content of 0.1 to 0.5% by weight, is not problematic, and need not reduce such a residual solvent content. However, it has been found that the thin cellulose ester film, unless the residual solvent content thereof is not more than 0.05% by weight, cannot restrain the deformation at higher temperature. In the invention, the residual solvent content of the film is preferably not more than 0.04% by weight, and more preferably not more than 0.02% by weight. The residual solvent content of the cellulose ester film can be reduced, by increasing a drying time or by drying at higher temperature in the drying step of the web. It requires drying for a longer time at higher temperature to obtain a thick cellulose ester film to have the preferable residual solvent content. However, it has been found that the thin cellulose ester film having the preferable residual solvent content can be easily obtained. In order to obtain an intended reduced residual solvent content, an effective combination of drying time and drying temperature is required. The drying temperature is preferably 100 to 200° C., and the drying time is preferably 5 to 30 minutes. The heating methods include one bringing a heated guide roller into contact with a cellulose ester web, one uniformly and directly blowing a heated air onto a cellulose ester web, one uniformly exposing a cellulose ester web to an infrared light, and one bringing a cellulose ester web into contact with closely arranged heated rollers at an area as broad as possible. The heating method is optionally selected from the methods described above, but is not limited thereto as long as it meets the present invention. The reduced residual solvent content in the invention minimizes deformation of the film under high temperature, and provides improved dimensional stability under change in temperature and humidity.

In the invention, the residual solvent content of the cellulose ester film, when the content is very low, for example, 0.05% by weight as that of the finished cellulose ester film, is represented in terms of percentage (% by weight) in which the solvent content by weight of the film measured according to gas chromatography is divided by the film weight and multiplied by 100.

The residual solvent content at the winding step referred to in the invention implies a residual solvent content of a cellulose ester film immediately after wound in a roll form around a spool, for example, a spool 11 as shown in FIG. 1 or a residual solvent content of a cellulose ester film on the spool side with a length of ½ of the total length of the cellulose ester film in the roll form.

The difference between the maximum residual solvent content at the winding step and the minimum residual solvent content at the winding in the transverse direction of the cellulose ester film is preferably not more than 0.05% by weight. The maximum and minimum residual solvent contents for the difference are determined as follows:

The cellulose ester film is divided into twenty equal parts in the transverse direction. The residual solvent content of each part is measured, and the maximum and minimum residual solvent contents are determined from the measurements.

The constitutions of items 3 through 8 above relate to the method comprising the steps of peeling a thin cellulose ester web at a peel position from a metal support and transporting the peeled web from the peel position to a tension changing device such as a drive roller at an extremely low tension such as 10 to 100 N/m. The peeled web at the peeling has still a high residual solvent content and is soft. Therefore, when such a web is transported at such a high tension of 150 to 200 N/m as is applied to manufacture a comparatively thick cellulose ester film such as a film with a dry thickness of 80 μm, the web is subjected to high stress and elongated in the transporting direction, which affects adversely optical properties of the finished film. In contrast, if the tension is reduced according to a sectional area of the web, the force rotating the guide rollers is weakened, slipping occurs between the guide roller and the web surface, producing scratches on the resulting cellulose ester film surface. Study has been made on a thin cellulose ester film such as a cellulose ester film with a dry thickness of 20 to 60 μm in order to overcome the problems described above, and as a result, it has been found that the above problems is overcome by transporting the cellulose ester web at a low tension, for example, at a tension of 10 to 100 N/m, preferably 10 to 80 N/m, and more preferably 10 to 50 N/m. An air float transport at a high tension does not produce scratches, but is likely to produce elongation. Therefore, the web is preferably transported at the low tension described above.

Change of a part or all of the guide rollers to tendency rollers (rollers rotating according to the transporting speed) can minimize the scratches and elongation, and is preferable in the invention. The guide rollers are preferably low in inertia. The distance between the web peeling position and the tension changing device is preferably 2 to 90 m in terms of the web length. The peeled web is dried while transported from the peeling position to the tension changing device, and then may be further dried in a tenter dryer maintaining the web width in the transverse direction constant and optionally stretching a little the web in the transporting direction. The residual solvent content of the web at the peeling is preferably 70 to 100% by weight, in view of productivity and high quality without the defects described above.

The constitutions of items 9 to 12 relate to a dissolution step in which a cellulose ester dope capable of minimizing air bubbles in a cellulose ester film is obtained.

When a cellulose ester film with air bubbles is used as a protective film of a polarizing plate in a liquid crystal display, serious optical defects occur, and recently, air bubbles of such a size as has not been not so problematic have been regarded as defects. In the invention, the air bubbles refer to those contained in a finished cellulose ester film, and the size of the air bubbles refers to the maximum length of air bubbles when observed from the direction normal to the film surface. The size of air bubbles tend to increase as the dry thickness of a cellulose ester film becomes smaller. The air bubbles in the cellulose ester dope are compressed and deformed into disk form in a thin cellulose ester film to increase their size. Air bubbles, which are not so noticeable in a cellulose ester film with a dry thickness exceeding 60 μm, become detectable in a cellulose ester film with a dry thickness of 20 to 60 μm. For example, air bubbles with a size of 0.3 μm in a cellulose ester film with a dry thickness of 20 to 60 μm are often observed as those with a size less than 0.3 μm in a cellulose ester film with a dry thickness exceeding 60 μm. A cellulose ester web being elongated while transported, air bubbles formed in a cellulose ester film are not disc-shaped and are deformed into an ellipsoid such as a rugby ball. Air bubbles are compression resistant, and are present even in the deformed cellulose ester film without their volume change. The deformation degree is higher particularly in a thin cellulose ester film.

In the invention, the air bubble in a cellulose ester film being observed from the direction normal to the film surface, the size thereof is obtained by being measured through a magnifying glass or a microscope. The size of air bubbles in the invention, when the air bubbles are spheres, mean a diameter of the spheres, and when the air bubbles are ellipsoids, mean a major axis length of the ellipsoids.

The present inventors has made an extensive study in order to obtain a cellulose ester dope containing no air bubbles, and as a result, they have succeeded to obtain obtaining a cellulose ester film containing no air bubbles, except for those of a size smaller than a detectable size.

The air bubbles are produced in a cellulose ester dope in the step of dissolving a cellulose ester in a solvent. In order to defoam the cellulose ester dope, a method has been carried out in which a filtered cellulose ester dope is placed in a defoaming apparatus (an apparatus similar to storing vessel 3 in FIG. 1), allowed to stand for 24 hours during which air bubbles move to the surface of the dope, and is defoamed by optionally heating. This method has been considered to provide a defoamed dope. However, minute air bubbles cannot be removed by this method, and the presence of such minute air bubbles in the cellulose ester film has been not problematic so far.

The present inventors have considered that it is difficult to defoam a cellulose ester dope containing air bubbles, and have found a method of removing air bubbles in the step (the dissolution step) of dissolving a cellulose ester in a solvent to obtain a cellulose ester dope containing no air bubbles.

The constitutions of items 9 to 12 will be explained below.

Figure 3:
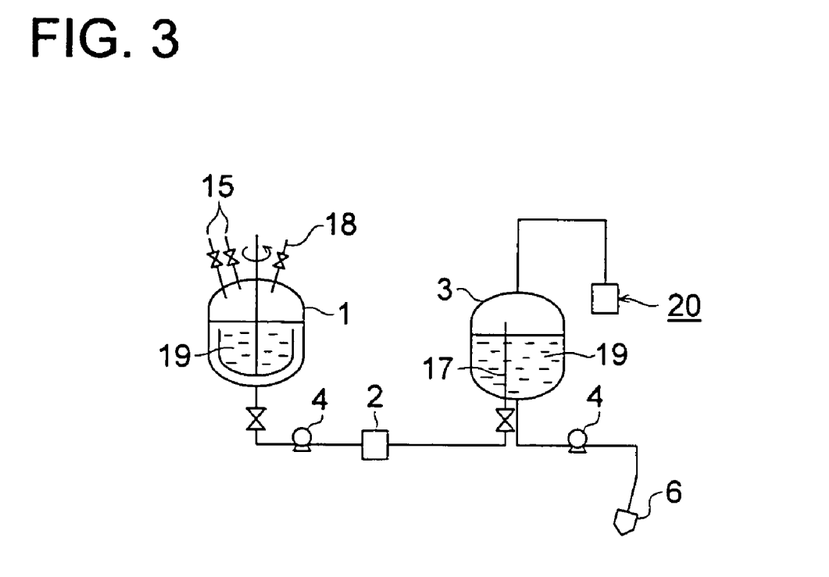
FIG. 3 shows a schematic view of one embodiment of the dissolution step in the invention.

FIG. 3 shows a schematic view of one embodiment of the dissolution step in the invention, and extracts the dissolution step in the solution cast film manufacturing apparatus in FIG. 2. Cellulose ester and solvents comprising an organic solvent with a boiling point BP (° C.) were incorporated from a material incorporating port 15 into a pressure resistant vessel 1, mixed therein, heated to around BP, opening a valve 18 while the vessel is allowed to stand at that temperature, heated for dissolution, and cooled to obtain a cellulose ester dope 19, and the dope is transported to a storing vessel 3 through a filter 2 employing a constant rate pump 4. The dope is transported to the storing vessel 3 from a port of a dope transport tube 17, the port being located at a position lower than the surface of a dope beforehand stored, whereby the dope is stored in storing vessel 3 not to produce air bubbles. A liquid seal device 20 is provided on the top of the storing vessel 3 so that the upper space within the vessel is filled with an organic solvent vapor.

Figure 4:
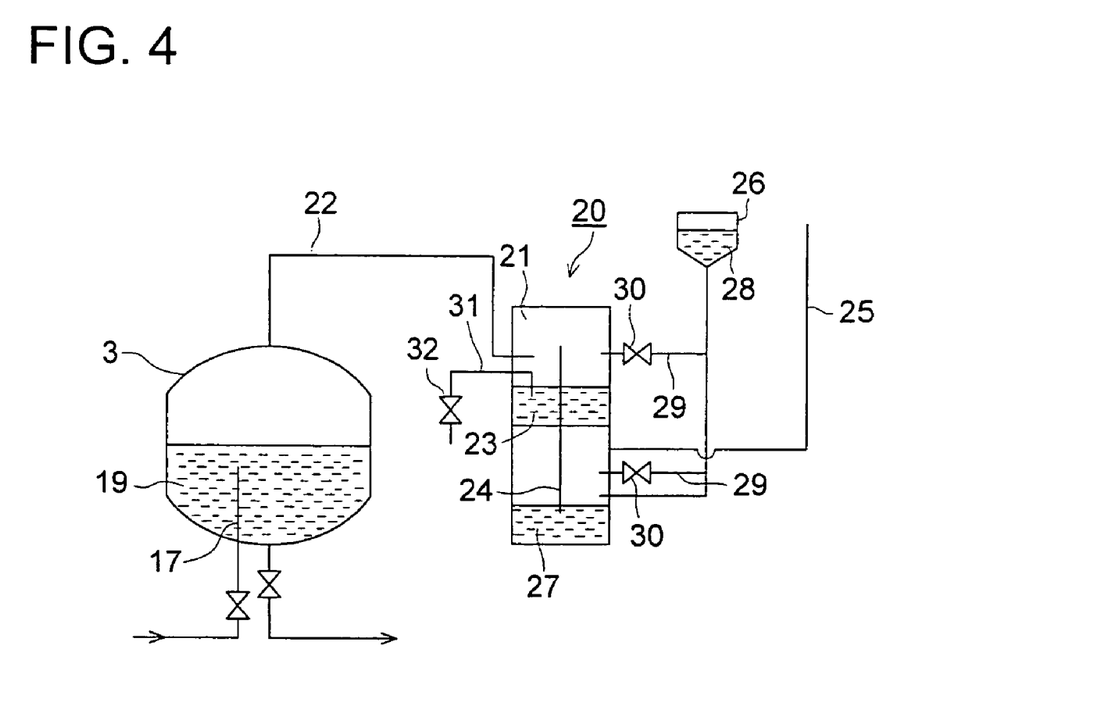
FIG. 4 shows a schematic view of a liquid seal apparatus.

FIG. 4 shows a schematic view of a liquid seal apparatus. The liquid seal apparatus 20 will be explained below.

A vent tube 22, which connects a space within the storing vessel 3 to a liquid seal device body 21, transmits pressure change in the storing vessel 3 to a liquid seal device body 21. The liquid level of an upper organic solvent 23 in the liquid seal device body 21 varies according to the change in the pressure in the storing vessel 3. The volume of the upper space over the organic solvent 23 varies according to the change of the liquid level, which changes, through a pressure control tube 24, the volume of the lower space under the organic solvent 23, and the lower space volume is adjusted through an atmosphere open tube 25 leading atmosphere. Since an organic solvent 23 or 27 is evaporated and reduced, an organic solvent 28 for supplement is supplied from an organic solvent supply device 26 in an amount corresponding to the reduced amount. By employing such a liquid seal device 20, the space above the dope surface of the dope 19 in the storing vessel 3 is always filled with an organic solvent vapor, and does not directly contact atmospheric air. Numerical number 29 is an organic solvent supply tube, numerical number 30 is a valve, numerical number 31 is a pressure control tube, and numerical number 32 is a backflow control valve.

The constitutions of items 9 and 10 will be explained below.

Step a): Cellulose ester flakes and one or more solvents comprising an organic solvent with a boiling point BP (° C.) as the main organic solvent are mixed in a tightly sealed pressure resistant vessel and heating the mixture to around BP (for example, 40.6° C., which is a boiling point of methylene chloride, or 56.9° C., which is a boiling point of methyl acetate). The term, "BP" herein referred to implies a temperature of from BP–3° C. to BP+3° C., and preferably from BP–1° C. to BP+1° C. The term, "main organic solvent" herein referred to implies an organic solvent contained in an amount of not less than 50% by weight in the one or more solvents.

Step b): The resulting mixture heated to that temperature is allowed to stand for not less than 6 minutes, and more preferably not less than 10 minutes, during which the valve on the top of the vessel was open. Thereafter, the mixture is further re-heated to a temperature of not less than BP to complete dissolution of the cellulose ester, cooled to obtain a cellulose ester dope, and filtered. A cellulose ester film containing no air bubbles is prepared from the cellulose ester dope obtained above according to a solution cast film manufacture process described later. In the above dissolution step, if a period during which the mixture heated to around BP is allowed to stand is not less than 6 minutes, it is sufficient to eliminate air bubbles in the cellulose ester film, and immediately after that, the mixture may be heated to complete dissolution and obtain a cellulose ester dope. Alternatively, the mixture may be allowed to stand overnight or for a longer time according to the working manner in the dissolution step.

The constitutions of items 9 and 10 can provide a cellulose ester film containing no air bubbles. However, when the re-heating temperature, after the mixture heated to around BP is allowed to stand for not less than 6 minutes, is lower, the filtration pressure increases while the resulting solution is filtered for a long time. As the filtration pressure approaches its control limit, undissolved substances in the solution are difficult to pass a filter medium material, influencing quality of the finished cellulose ester film. The undissolved substances described above are considered to be cellulose esters with a different ester substitution degree or cellulose esters with a different polymerization degree. Even if these undissolved substances can be removed by an ordinary filtration, they are difficult to be removed due to increased filtration pressure.

In the step b) above, the re-heating of the mixture to a temperature of not less than BP is followed by the following steps c) and d), whereby productivity is stabilized for a long time and a large quantity of cellulose ester film containing no air bubbles can be obtained. Items 11 and 12 described above relate to these steps C) and d), and will be explained below.

Step c): The pressure resistant vessel is tightly resealed by closing the valve on the top of the vessel, and heated to a temperature of from BP+20° C. to BP+50° C. The pressure in the vessel is in a state of increased pressure, and increases more and more as the temperature is elevated. The temperature elevation rate is not specifically limited, but is preferably 0.3 to 5 minutes per ° C., and more preferably 0.5 to 3 minutes per ° C.

Step d): The tightly-resealed vessel is maintained at a temperature of from BP+20° C. to BP+50° C. and more preferably from BP+25° C. to BP+45° C. to be in a state of increased pressure to complete dissolution. The maintenance time is not specifically limited, but is preferably 10 to 180 minutes according to the manner of the dissolution step. The shorter the maintenance time is the better. The temperature is set within the range of from BP+20° C. to BP+50° C., in economic point of view or in view of quality requirements including a cellulose ester film with no air bubbles.

The resulting dope is cooled. The cooling rate is not specifically limited, but is preferably 0.05 to 10 minutes per ° C., and more preferably 0.5 to 5 minutes per ° C. The cooled dope temperature is not specifically limited as long as it is less than BP. The temperature is preferably as high as possible in view of ease of filtration, and it is preferably from less than BP to BP−15° C., and more preferably from less than BP−0.5 to BP−10° C., considering a viscosity of the dope at a solution cast which follows.

The cooled dope is filtered, transported to a dope storing vessel, and stored therein. As described above, the dope obtained through the steps c) and d) contains no undissolved substances, and can be transported over a long time without clogging the filter medium Generally, filter medium for filtration is preferably smaller in an absolute filtration accuracy. Too small absolute filtration accuracy is likely to clog the filter medium, and a filter must be frequently changed, resulting in lowering of productivity. The filter medium for a cellulose ester solution or dope is one with an absolute filtration accuracy of preferably not more than 40 μm, and more preferably 10 to 20 μm. Materials of the filtration medium are not specifically limited, but are preferably plastics such as polypropylene or Teflon or metals such as stainless steel, in view of no falling off of the fabric.

A cellulose ester film is prepared employing the dope obtained above according to a solution cast film manufacture process.

A cellulose ester film prepared employing the dope obtained according to the procedures described above contains no air bubbles with a size of not less than 0.3 μm.

The conventional method called a high temperature dissolution method comprises the steps of mixing a cellulose ester and organic solvents, and elevating to a temperature of more than a boiling point of the main organic solvent. This method does not comprise the steps b) and c) described above. This method can provide a cellulose ester solution or dope, but cannot eliminate air bubbles in the solution or dope.

In any dissolution step described above, stirring is carried out. The technique comprising the dissolution step in the invention, which eliminates air bubbles with a size of not less than 0.3 μm in a cellulose ester film, can eliminate such air bubbles in a cellulose ester film having a dry thickness of not less than 60 μm. The method according to the invention can eliminate air bubbles with a size of not less than 0.3 μm, and the cellulose ester film obtained according to the method of the invention is useful for preparing a protective film for a polarizing plate, a polarizing plate, and a liquid crystal display with high quality.

A cast process of a cellulose ester dope useful for the invention will be explained.

The cast process is one in which the dope obtained above is conveyed to a pressure die through a pressure type metering gear pump, and cast from said pressure die onto a casting site of a moving endless metal belt. The pressure die is preferred in which the shape at the mouth piece (the port extruding the dope) portion of the die slit can be regulated and the film thickness is readily regulated to be uniform. Examples of the pressure die include a coat hanger die, a "T" die, and the like, and any of these is preferably employed. In order to increase the casting speed, two or more pressure dies may be provided on the metal support and dopes divided into two or more may be simultaneously cast on the metal support. The thickness of the cellulose ester film can be adjusted by a dope concentration, a dope convey amount, the die slit gap, a die extrusion pressure, or a moving speed of the metal support.

In the drying process on the metal support (a process heating a cellulose ester web on the support and evaporating an organic solvent), the solvent evaporation processes includes methods include a method in which air is blown from the web side and support side, a method in which heating is carried out from the reverse surface of the support employing heated liquid, and a method in which heating is carried out from the surface as well as the revere surface employing heat radiation. In the invention any method is preferably used due to high drying efficiency, and a combination thereof is also preferably used. Temperature of the web or the support may be uniform or different in different places. The metal support carries away evaporation heat due to evaporation of the organic solvent in the web, and is cooled. Accordingly, it is preferred that the support is heated to a temperature lower than the boiling point of the main organic solvent, and the reverse surface liquid heating method is preferable for heating the support.

Next, the dope and materials constituting the cellulose ester film used in the invention will be explained.

The composition of the dope in the invention contains a cellulose ester and an organic solvent, and optionally a plasticizer, a UV absorbent, an anti-oxidant, and a matting agent. The organic solvents include a good solvent (corresponding to the main organic solvent described above) capable of dissolving a cellulose ester and a poor solvent which does not dissolve a cellulose ester. In the poor solvents, there are a poor solvent which increases dissolution in a solvent of a cellulose ester by addition in a small amount, and a poor solvent which gels the web on a metal support by the addition in a large amount. A mixture thereof may be used in the invention.

The cellulose ester used in the invention will be explained below.

The cellulose esters used in the cellulose ester film in the invention are prepared by reacting cellulose selected from those of linter pulp, tree pulp and kenaf pulp with acetic anhydride, propionic anhydride, or butyric anhydride, according to an ordinary method, and include cellulose triacetate, cellulose acetate propionate, cellulose acetate butyrate, and cellulose acetate propionate butyrate each having a total acyl substitution degree of 2.5 to 3.0. The cellulose ester in the invention has an acetyl substitution degree of preferably at least 1.5. The acyl substitution degree of the cellulose ester can be measured according to ASTM-D817-96. The number average molecular weight of the cellulose ester is preferably 70,000 to 300,000, and more preferably 80,000 to 200,000, in providing good mechanical strength as a cellulose ester film. Generally, cellulose esters are obtained in flake form after the reaction and washing, and are used in that form. Spherical cellulose esters with a particle size of 0.05 to 2.0 mm are preferable in view of dissolution speed. The cellulose ester content of the cellulose ester dope is preferably 10 to 35% by weight.

Examples of good solvents of the cellulose ester include methyl acetate, ethyl acetate, amyl acetate, ethyl formate, acetone, cyclohexanone, methyl acetoacetate, tetrahydrofuran, 1,3-dioxolan, 4-methyl-1,3-dioxolan, 1,4-dioxane, 2,2,2-trifluoroethanol, 2,2,3,3-tetrafluoro-1-propanol, 1,3-difluoro-2-propanol, 1,1,1,3,3,3-hexafluoro-2-methyl-2-propanol, 1,1,1,3,3,3-hexafluoro-2-propanol, 2,2,3,3,3-pentafluoro-1-propanol, nitroethane, 2-pyrrolidone, N-methyl-2-pyrrolidone, 1,3-dimethyl-2-imidazolidinone, methylene chloride or bromopropane. Of these, methyl acetate and methylene chloride (these form the main organic solvent dissolving the cellulose ester described above) are preferably used. However, an organic solvent containing no chloride is preferable in view of environmental problem, and preferably methyl acetate.

Examples of poor solvents include an aliphatic alcohol having a carbon atom number of 1 to 6, cyclohexanol, and cyclohexane. Of these, an aliphatic alcohol having a carbon atom number of 1 to 4 is preferable, and ethanol, which is less harmful, is more preferable. A combined use of the above described good solvent and the poor solvent is preferable in that viscosity of the dope is reduced, and a film manufacturing speed is increased.

The cellulose ester film of the invention preferably contains a plasticizer. The plasticizer used in the invention is not limited, but Examples of the plasticizer include a phosphate such as triphenyl phosphate, tricresyl phosphate, cresyldiphenyl phosphate, octyldiphenyl phosphate, diphenylbiphenyl phosphate, trioctyl phosphate, or tributyl phosphate, a phthalate such as diethyl phthalate, dimethoxyethyl phthalate, dimethyl phthalate, dioctyl phthalate, dibutyl phthalate, or di-2-ethylhexyl phthalate, a glycolic acid ester such as butyl phthalyl butyl glycolate, ethyl phthalyl ethyl glycolate, or methyl phthalyl ethyl glycolate, and a glycerin ester such as triacetin, tributyrin. These plasticizers may be used singly or in combination. The use of the phosphate plasticizer is preferable in increasing resistance to hydrolysis of a cellulose ester film or durability of a cellulose ester film. The use of the phthalate or glycolic acid ester plasticizer is also preferable.

The plasticizer content of a cellulose ester film is preferably 0.5 to 30% by weight, and more preferably 2 to 15% by weight.

In the invention, the cellulose ester film of the invention preferably contains a UV absorbent. The UV absorbent in the invention is preferably a UV absorbent which has excellent absorption of ultraviolet light having a wavelength of 370 nm or less, and has reduced absorption of visible light having a wavelength of 400 nm or more in clearly displaying a liquid crystal image. The UV absorbents have a transmittance at 370 nm of preferably not more than 10%, more preferably not more than 5%, and most preferably not more than 2%. The UV absorbents used in the invention include an oxybenzophenone compound, a benzotriazole compound, a salicylic acid ester compound, a benzophenone compound, a cyanoacrylate compound and a nickel complex compound. The benzotriazole compound, which is more colorless, is preferably used. The UV absorbents disclosed in Japanese Patent O.P.I. Publication Nos. 10-182621 and 8-337574 or the polymer UV absorbents disclosed in Japanese Patent O.P.I. Publication No. 6-148430 are also preferably used.

As UV absorbents preferably used in the invention, the benzotriazole or benzophenone type UV absorbent is preferably used which has high transparency, and minimizes deterioration of a polarizing plate or a liquid crystal. The benzotriazole type UV absorbent is especially preferably used which minimizes undesired coloration.

Example of the UV absorbent used in the invention include UV-1: 2-(2'-hydroxy-5'-methylphenyl)-benzotriazole, 2-(2'-hydroxy-3',5'-di-t-butylphenyl)-benzotriazole, 2-(2'-hydroxy-3'-t-butyl-5'-methylphenyl)-benzotriazole, 2-(2'-hydroxy-3',5'-di-t-butylphenyl)-5-chlorobenzotriazole, 2-(2'-hydroxy-3'-(3",4",5",6"-tetrahydrophthalimidomethyl)-5'-methylphenyl)-benzotriazole, 2,2-methylenebis(4-(1,1,3,3-tetramethylbutyl)-6-(2H-benzotriazole-2-yl)phenol), 2-(2'-hydroxy-3'-t-butyl-5'-methylphenyl)-5-chlorobenzotriazole, 2-(2H-benzotriazole-2-yl)-6-(straight-chained or branched dodecyl)-4-methylphenol, and a mixture of octyl-3-[3-t-butyl-4-hydroxy-5-(chloro-2H-benzotriazole-2-yl)phenyl]propionate and 2-ethylhexyl-3-[3-t-butyl-4-hydroxy-5-(5-chloro-2H-benzotriazole-2-yl)phenyl]propionate.
Commercially available TINUBIN 109, 171 and 326 (each produced by Ciba Co., Ltd.) are also preferably used.

Examples of the benzophenone compound include 2,4-dihydroxybenzophenone, 2,2'-dihydroxy-4-methoxybenzophenone, 2-hydroxy-4-methoxy-5-sulfobenzophenone, and bis (2-methoxy-4-hydroxy-5-benzoylphenylmethane), but are not limited thereto.

The UV absorbents may be used in combination of two or more kinds thereof. The UV absorbents may be added to a dope in the form of a solid or in the form of a solution in which the UV absorbents are dissolved in an organic solvent such as alcohol, methylene chloride or dioxolane. Undissolution materials are dispersed in a mixture of an organic solvent and cellulose ester employing a dissolver or a sand mill, and added to a dope. The UV absorbent addition amount is preferably 0.5 to 20% by weight, more preferably 0.6 to 5.0% by weight, and most preferably 0.6 to 2.0% by weight, based on the cellulose ester. The UV absorbent addition is contained in the cellulose ester film in an amount of preferably 0.2 to 2.0 g, more preferably 0.4 to 1.5 g, and most preferably 0.6 to 1.0 g, per $m^2$ of the cellulose ester film.

The cellulose ester film of the invention preferably contains an anti-oxidizing agent. Examples of the anti-oxidizing agent include hindered phenol compounds such as 2,6-di-t-butyl-p-cresol, pentaerythrityl-tetrakis[3-(3,5-di-t-butyl-4-hydroxyphenyl)propionate], triethylene glycol-bis[3-(3-t- butyl-5-methyl-4-hydroxyphenyl)propionate], 1,6-hexanediol-bis[3-(3,5-di-t-butyl-4-hydroxyphenyl) propionate], 2,4-bis-(n-octylthio)-6-(4-hydroxy-3,5-di-t-butylanilino)-1,3,5-triazine, 2,2-thio-diethylenebis[3-(3,5-di-t-butyl-4-hydroxyphenyl)propionate], octadecyl-3-(3,5-di-t-butyl-4-hydroxyphenyl)propionate, 1,3,5-trimethyl-2,4,6-tris(3,5-di-t-butyl-4-hydroxybenzyl)benzene, and tris-(3,5-di-t-butyl-4-hydroxybenzyl)-isocyanurate. Of these, 2,6-di-t-butyl-p-cresol, pentaerythrityl-tetrakis[3-(3,5-di-t-butyl-4-hydroxyphenyl)propionate], and triethylene glycol-bis[3-(3-t-butyl-5-methyl-4-hydroxyphenyl)propionate] are especially preferable. A metal-inactivating hydrazine compound such as N,N'-bis[3-(3,5-di-t-butyl-4-hydroxyphenyl) propionyl]-hydrazine or a phosphor-containing stabilizer such as (2,4-di-t-butylphenyl)phosphite can be used in combination. The content of these compounds in the cellulose ester film is preferably 1 ppm to 1.0% by weight, and more preferably 10 to 1000 ppm by weight based on the cellulose ester weight.

The cellulose ester film of the invention preferably contains a fine particle matting agent. Examples of the fine particle matting agents include inorganic compounds such as silicon dioxide, titanium dioxide, aluminum oxide, zirconium oxide, calcium carbonate, kaolin, talc, burned calcium silicate, hydrated calcium silicate, aluminum silicate, magnesium silicate, and calcium phosphate, and cross-linked polymers. The fine particles are preferably silicon dioxide in providing a reduced haze. The secondary order particles of the fine particles have an average particle diameter of 0.01 to 1.0 μm, and the fine particle content of the film is preferably 0.005 to 0.3 weight %. The fine particles such as silicon dioxide particles are often surface treated with an organic compound, especially with a compound having a methyl group. Such surface treated fine particles are preferable in giving a reduced haze to the film. Examples of the organic compound used in the surface treatment include halogenated silanes, alkoxysilanes (especially, methylsilane), silazanes, and siloxanes. Fine particles having a larger average particle diameter has a high matting effect, and fine particles having a smaller average particle diameter has a good transparency. The primary order particles of the fine particles have an average particle diameter of preferably 5 to 50 nm, and more preferably 7 to 14 nm. It is preferred that the fine particles exist as aggregates in the cellulose ester film to provide a peak to valley distance of 0.01 to 1.0 μm on the film surface. The silicon dioxide fine particles are, for example, Aerosil 200, 200V, 300, R972, R972V, R974, R812, R202, OX50, or TT600 (each produced by Nihon Aerosil Co., Ltd.), and are preferably Aerosil R972, R972V, R974, R202 or R812. The fine particles may be used as a mixture of two or more kinds thereof at any amount ratio. Two matting agents different in material or average particle diameter from each other, for example, Aerosil 200V and R972 can be used in a 200V to R972 amount ratio of from 0.1:99.9 to 99.9:0.01. The dispersion method of a matting agent is not specifically limited, but the use of a high pressure dispersion apparatus such as a dissolver can provide a dispersion in which the matting agent is dispersed in fine particles. The dispersion may be mixed with a cellulose ester. The matting agent dispersion may be mixed with a cellulose ester dope during the dissolution process, and may be in-line mixed with a cellulose ester dope in an in-line mixer (for example, a static pipe mixer Hi-Mixer produced by Toray Co., Ltd.) immediately before the dope is fed to a die.

EXAMPLES

The invention will be detailed according to the following examples, but is not limited thereto.

Measurement and Evaluation Method (Measurement of the Residual Solvent Content of the Cellulose Ester Film)

The web sample was taken at the winding step, placed in a sample bottle, and tightly closed so that the sample is not exposed (does not absorb moisture). The sample was measured through gas chromatography with a head space sampler. As the gas chromatography, gas chromatography 5890 type SERIES II and a head space sampler HP 7694 each produced by Hewlett-Packard Co., Ltd. are used, and measurement was carried out according to the following method.

| | |
|---|---|
| Heating condition of the head space sampler: | 120° C. for 20 minutes |
| Injection temperature to gas chromatography | 150° C. |
| Heating speed (after maintaining at 40° C. for 5 minutes, heated to 100° C.): | 8° C./minute |
| Column used: | DB-WAX with an inside diameter of 0.32 mm, and a length of 30 m produced by J & B Co., Ltd) |

(Measurement of Elongation and Shrinkage)

The cellulose ester film sample was allowed to stand at an ordinary temperature and humidity of 23+3° C. and at 55±3% RH, and the length $L_0$ (mm) in each of the longitudinal and transverse directions was measured. Subsequently, the cellulose ester film sample was allowed to stand at a high temperature of 105±3° C. and at a low humidity of 2±2% RH for 5 hours, cooled to the ordinary temperature and humidity, and then, the resulting length $L_1$ (mm) in each of the longitudinal and transverse directions was measured. The rate (S5h) of elongation and shrinkage is represented by the following formula:

$$S5h\ (\%) = \{(L_1 - L_0)/L_0\} \times 100$$

(Evaluation of Scratches)

The roll film sample was cut into a length of 1 m. Scratches on the cut sample surface were observed through the reflection light of a fluorescent lamp reflected from the sample, and the sample was evaluated according to the following criteria.

A: No scratches observed

B: Small scratches (a length of not more than 0.5 mm) were observed on a pat of the sample surface.

C: Randomly occurring scratches with a length of about 0.5 mm were observed on the surface area of not more than 10% of the total surface area.

D: Regularly occurring scratches with a length of about 0.5 mm were observed on the surface area of not more than 10% of the total surface area.

(Evaluation of Film Elongation)

Elongation percentage (%) was obtained from the following formula:

$$\text{Elongation percentage (\%)} = \{(U_1 - U_0)/U_0\} \times 100$$

wherein $U_0$ represents a web stainless steel support speed, and $U_1$ represents a web transport speed after the web was peeled from the stainless steel support, each being measured through a non contact type speed meter produced by Mitsubishi Electric Corporation. Elongation was evaluated according to the following criteria:

A: Elongation percentage was 0.0%.
B: Elongation percentage was 0.1 to 0.5%.
C: Elongation percentage was 0.6 to 2.0%.
D: Elongation percentage was 2.1 to 4.0%.
E: Elongation percentage was 4.1 to 6.0%.
F: Elongation percentage was not less than 6.1%.

(Evaluation of Air Bubbles)

Five hundred meter long film sample was cut in the mechanical direction from the rolled cellulose ester film, and further cut into film samples with a length of 1 m. One hundred samples were selected these samples, and air bubbles contained herein were observed. The diameter or the maximum length of the air bubbles was measured through a microscope or a magnifying glass. Further, the number of air bubbles was counted, and the average number per 1 $m^2$ of air bubbles was computed.

Example 1

(Dope Composition)

| | |
|---|---|
| Cellulose triacetate with an acetyl substitution degree of 2.75 | 415 weight parts |
| Methylene chloride | 100 weight parts |
| Ethanol | 24 weight parts |
| TINUVIN 326 | 0.4 weight parts |
| TINUVIN 109 | 0.9 weight parts |
| TINUVIN 171 | 0.9 weight parts |
| Ethylphthalylethyl glycolate | 4 weight parts |
| Triphenyl phosphate | 8 weight parts |
| The following silicon dioxide particle dispersion liquid | 156 weight parts |

(Preparation of Silicon Dioxide Particle Dispersion Liquid)

The following silicon dioxide particle containing liquid was mixed with the following cellulose triacetate solution with stirring, and filtered to obtain a silicon dioxide particle dispersion liquid.

| (Cellulose triacetate solution) | |
|---|---|
| Cellulose triacetate with an acetyl substitution degree of 2.75 | 6 weight parts |
| Methylene chloride | 140 weight parts |
| (Silicon dioxide particle containing liquid) | |
| Aerosil R972V | 1 weight part |
| Ethanol | 9 weight parts |

The above Aerosil and ethanol were mixed with stirring in a dissolver for 30 minutes, and dispersed in a mantongorin type high pressure disperser to obtain a silicon dioxide particle containing liquid.

The above dope composition was incorporated in a pressure resistant vessel, except for the silicon dioxide particle containing liquid, and stirred at 60° C. to prepare a cellulose ester solution. Thereafter, the silicon dioxide particle containing liquid was added to the cellulose ester solution, sufficiently stirred, filtered employing Azumi filter paper No. 244, produced by Azumi Roshi Co., Ltd., and further filtered employing Finemet NM with an absolute filtration precision of 10 μm produced by Nihon Seisen Co., Ltd. Thus, a cellulose ester dope was obtained.

The resulting cellulose ester dope was cast on a stainless steel belt support to form a web and to give a dry thickness as shown in Table 1, and dried to give a residual solvent content of the web of 70% by weight. Subsequently the resulting web was peeled from the stainless steel belt support, dried at 70 to 100° C. in a tenter dryer, while holding both width ends of the web. The holding being released, the web was dried at a temperature as shown in Table 1 in a roller dryer, 120° C. drying zone, and cooled to room temperature, and wound around a spool. Thus, cellulose ester film samples 1 to 7 as shown in Table 1 were obtained. The residual solvent content and elongation percentage thereof were measured. The results are shown in Table 1.

TABLE 1

| Sample No. | Drying Condition | Dry thickness (μM) | Residual solvent content at the winding step (weight %) | Residual solvent content difference in the transverse direction at the winding step (weight %) | Elongation Percentage (%) | Remarks |
|---|---|---|---|---|---|---|
| 1 | Dried at 110 to 130° C. for 5 minutes, and further at 150 to 180° C. for 20 minutes | 25 | 0.03 | 0.01 | −0.01 | Inv. |
| 2 | Dried at 110 to 130° C. for 5 minutes, and further at 150 to 180° C. for 20 minutes | 60 | 0.04 | 0.01 | −0.02 | Inv. |
| 3 | Dried at 120 to 140° C. for 8 minutes, and further at 160 to 190° C. for 25 minutes | 25 | 0.01 | 0.005 | −0.005 | Inv. |

TABLE 1-continued

| Sample No. | Drying Condition | Dry thickness (μM) | Residual solvent content at the winding step (weight %) | Residual solvent content difference in the transverse direction at the winding step (weight %) | Elongation Percentage (%) | Remarks |
|---|---|---|---|---|---|---|
| 4 | Dried at 120 to 140° C. for 8 minutes, and further at 160 to 190° C. for 25 minutes | 60 | 0.02 | 0.008 | −0.01 | Inv. |
| 5 | Dried at 100 to 130° C. for 5 minutes | 25 | 0.15 | 0.05 | −0.25 | Comp. |
| 6 | Dried at 100 to 130° C. for 5 minutes | 60 | 0.35 | 0.10 | −0.18 | Comp. |
| 7 | Dried at 100 to 130° C. for 5 minutes | 70 | 0.08 | 0.03 | −0.09 | Comp. |

Inv.: Invention,
Comp.: Comparative

The cellulose ester film with minimized elongation was obtained by reducing the residual solvent content after drying to not more than 0.05% by weight and by decreasing the residual solvent content difference in the transverse direction. In contrast, the cellulose ester film having a conventional residual solvent content exhibited a great elongation. The cellulose ester film according to the present invention can minimize its deformation, and improve its quality.

Example 2

The cellulose ester dope prepared in Example 1 was cast on a stainless steel belt support to form a web and to give a dry thickness as shown in Table 2, and dried to give a residual solvent content of the web of 70% by weight. Subsequently the resulting web was peeled from the stainless steel belt support, dried at 100 to 120° C. for 10 minutes, while transported 50 m in terms of the web length from the peeled position to a tension changing device at a tension as shown in Table 2, employing a transport means as shown in Table 2, and wound around a spool. Thus, cellulose ester film samples 8 to 23 as shown in Table 1 were obtained Scratches thereof were observed and elongation percentage thereof was measured. The results are shown in Table 2.

The numerical number at column "Transport device" in Table 2 is as follows:

1: 100% of light and hollow rollers with a low inertia
2: 50% of light and hollow rollers with a low inertia and 50% of tendency rollers
3: 90% of light and hollow rollers with a low inertia and 10% of tendency rollers
4: 10% of light and hollow rollers with a low inertia and 90% of tendency rollers
5: 100% of tendency rollers
6: 100% of air rollers

TABLE 2

| Sample No. | Dry thickness (μm) | Transport device | Transport tension (N/m) | Elongation percentage | Scratches | Remarks |
|---|---|---|---|---|---|---|
| 8 | 60 | 1 | 50 | A | A | Inv. |
| 9 | 60 | 1 | 80 | B | B | Inv. |
| 10 | 60 | 1 | 100 | C | B | Inv. |
| 11 | 60 | 2 | 80 | B | A | Inv. |
| 12 | 60 | 2 | 50 | A | A | Inv. |
| 13 | 60 | 3 | 80 | B | A | Inv. |
| 14 | 60 | 4 | 80 | A | A | Inv. |
| 15 | 60 | 5 | 80 | B | A | Inv. |
| 16 | 60 | 6 | 80 | B | A | Inv. |
| 17 | 60 | 6 | 20 | A | A | Inv. |
| 18 | 20 | 5 | 20 | A | A | Inv. |
| 19 | 20 | 6 | 20 | A | A | Inv. |
| 20 | 20 | 1 | 20 | A | B | Inv. |
| 21 | 10 | — | — | Web fractured at the peeling | No sample obtained | Comp. |
| 22 | 60 | 1 | 5 | A | D | Comp. |
| 23 | 60 | 1 | 110 | F | A | Comp. |

Inv.: Invention,
Comp.: Comparative

The cellulose ester film with reduced elongation and reduced scratches was obtained by casting the cellulose ester dope to give a dry thickness of 20 to 60 μm, peeling the web, and transporting the peeled web at a tension falling within the range in the invention. Use of the tendency rollers or the air rollers as the transport rollers provided the cellulose ester film with minimized elongation and minimized scratches (both rank "A"). In contrast, Sample 21 (comparative) prepared to give a dry thickness of 10 μm fractured at the peeling. Sample 22 (comparative) produced a lot of scratches on account of a too low transport tension such as 5 N/m. Sample 23 (comparative) with a dry thickness of 60 μm caused increased elongation on account of a too high transport tension.

Example 3

Samples 24 through 26 (inventive) and samples 27 through 29 (comparative) were prepared in the same manner as in Sample 8 of Example 2, except that the cellulose ester solution was prepared under the conditions as shown in Table 3, and cooled to 39° C. in 60 minutes (which is a cellulose ester dissolution step in the invention). The boiling point (BP) of the organic solvent used is 40.6° C. The results are shown in Table 3.

TABLE 3

| Sample No. | Step a) Heating | | Step b) Standing under atmospheric pressure | | Step C) Further heating | | Step d) Dissolution under increased pressure | | Number of air bubbles/m² | Remarks |
|---|---|---|---|---|---|---|---|---|---|---|
| | Temperature (° C.) | Time taken (minutes) | Temperature (° C.) | Standing time (minutes) | Temperature (° C.) | Time taken (minutes) | Temperature (° C.) | Time (minutes) | | |
| 24 | 35→41 | 20 | 41 | 20 | 41→70 | 60 | 70 | 20 | 0 | Inv. |
| 25 | 35→41 | 20 | 41 | 30 | 41→80 | 40 | 80 | 15 | 0 | Inv. |
| 26 | 35→41 | 20 | 41 | 20 | 41→*55 | 180 | *55 | 20 | 0 | Inv. |
| 27 | 35→70 | 70 | — | — | — | — | 70 | 20 | 3 | Comp. |
| 28 | 35→41 | 20 | 41 | **5 | 41→70 | 60 | 70 | 20 | 0.5 | Comp. |
| 29 | 35→41 | 20 | — | — | 41→70 | 60 | 70 | 20 | 3 | Comp. |

Inv.: Invention,
Comp.: Comparative

In Table 3 above, temperature *55 (° C.) is not temperature heated in the step c) or d) and is outside the temperature range defined in the step c) or d) in the invention, and the time **5 (minutes) is not time taken in the step b) and is outside the time range defined in the step b) in the invention.

The cellulose ester film of the invention had no air bubbles therein which was prepared employing the cellulose ester dissolution step in the invention. Sample 26, which was prepared employing the steps a) and b) but without employing the steps c) and d) also had no air bubbles therein. When sample 26 (Comparative) continued to be prepared for a long time, filtration pressure was increased and a little undissolved matter was observed in the dope. In contrast, Samples 24 and 25 could endure the manufacture over a long time without producing undissolved matter. Sample 27 (Comparative), which was prepared employing a conventional dissolution step, had many air bubbles therein. Sample 28 (Comparative), which was prepared without employing the step b), had a few air bubbles therein. Sample 28 (comparative), which was prepared except for the step b), had many air bubbles therein.

EFFECTS OF THE INVENTION

The present invention can provide a cellulose ester film with an extremely low elongation percentage and with no deformation. The present invention also can provide an excellent cellulose ester film without elongation and free from scratches or air bubbles. Further, the present invention can provide a thin cellulose ester film with high quality which is useful for a protective film of a polarizing plate or a liquid crystal display.

What is claimed is:

1. A process for making a cellulose ester film having a dry thickness of 20 to 60 μm, the process comprising the steps of:
   providing a cellulose ester dope;
   casting the cellulose ester dope on a support to form a cellulose ester web;
   peeling the cellulose ester web at a peel position from the support;
   transporting the peeled web to a dryer, drying the peeled web therein to forma cellulose ester film; and
   winding the cellulose ester film around a spool,
   wherein the cellulose ester dope is provided by a method comprising the steps of a) mixing a cellulose ester and one or more solvents comprising an organic solvent with a boiling point BP (° C.) as the main organic solvent in a tightly sealed pressure resistant vessel and heating the resulting mixture to around BP, b) unsealing the vessel at that temperature to allow it to stand for not less than 6 minutes, re-sealing the vessel and further heating the mixture to a temperature of from BP to BP+50 (° C.) to obtain a cellulose ester dope.

2. The process of claim 1, wherein the cellulose ester film contains no air bubbles with a size of 0.3 μm or more.

3. The process of claim 1, wherein the method comprising the steps of after the re-sealing, c) further heating the mixture to a temperature of BP+20 to BP+50 (° C.) to be in a state of increased pressure, and d) maintaining the resulting mixture at that pressure to obtain a cellulose ester dope.

4. The process of claim 3, wherein the cellulose ester film contains no air bubbles with a size of 0.3 μm or more.

* * * * *